(12) United States Patent
Szieff

(10) Patent No.: US 6,908,139 B1
(45) Date of Patent: Jun. 21, 2005

(54) TRUCK BED COVER

(76) Inventor: William K. Szieff, 6509 Nancy, Rancho Palos Verdes, CA (US) 90275

( * ) Notice: Subject to any disclaimer, the term of this patent is extended or adjusted under 35 U.S.C. 154(b) by 0 days.

(21) Appl. No.: 10/749,041

(22) Filed: Dec. 30, 2003

(51) Int. Cl.[7] .................................................. B60P 7/02
(52) U.S. Cl. ........................... 296/100.03; 296/100.04; 296/37.16; 296/136.04
(58) Field of Search ...................... 296/100.03, 100.04, 296/100.05, 37.16, 136.04, 136.01, 136.03

(56) References Cited

U.S. PATENT DOCUMENTS

| | | | | |
|---|---|---|---|---|
| 3,649,072 A | * | 3/1972 | Cross .................... | 296/100.03 |
| 4,198,091 A | * | 4/1980 | Appleton .................... | 296/63 |
| 4,741,570 A | * | 5/1988 | Lovaas .................. | 296/100.04 |
| 4,776,629 A | * | 10/1988 | Cross .................... | 296/100.03 |
| 6,224,138 B1 | * | 5/2001 | Adsit et al. ............ | 296/100.05 |

* cited by examiner

Primary Examiner—Joseph D. Pape
(74) Attorney, Agent, or Firm—Eric Karich

(57) ABSTRACT

A cargo bed cover for covering a cargo bed has a plurality of overlapping panels, and a surface and connectors for associating the plurality of overlapping panels such that the panels are movable between an extended configuration and a stored configuration. The cargo bed extends between a pair of side rails, a front wall, and a rear wall. In the extended configuration, the plurality of overlapping panels are extended in combination from the front wall to the rear wall. In the stored configuration, the plurality of overlapping panels are stacked vertically within or adjacent to the cargo bed.

20 Claims, 8 Drawing Sheets

TRUCK BED COVER

BACKGROUND OF THE INVENTION

1. Field of the Invention

This invention relates generally to cargo containers for motor vehicles, and more particularly to a vehicle cargo container with a retractable cover having panels that are adapted to be stored vertically within or adjacent to the cargo container.

2. Description of Related Art

In general, a truck is a motor vehicle suitable for hauling, and a pickup truck is a small truck with an open cargo area. A typical pickup truck includes an enclosed cabin for passengers and an open box-type bed called a cargo bay for hauling cargo. The cargo bay typically begins at a rear wall of the cabin, and includes two side rails and a tail gate opposite the rear wall of the cabin that can be lowered for cargo loading and unloading.

Cargo stored in the cargo bay of a pickup truck is unprotected from the weather, exposed to view, and vulnerable to vandalism and theft. Several different kinds of truck bed covers are currently available, including soft covers made from flexible materials such as canvas or plastic sheets, and hard covers including one or more rigid sections made from fiberglass or hard plastic. While soft truck bed covers protect cargo stored in a cargo bay from the weather and block the cargo from view, they are relatively easily breached and offer less security from vandalism and theft than hard truck bed covers.

A problem arises with hard truck bed covers in that they are typically heavy and bulky and require a significant amount of storage room. Sized to fit over an upper opening of the cargo bay, single-section hard truck bed covers typically cannot be stored in the cargo bay, and must be removed from the pickup truck when transporting cargo that extends above the side rails. While the sections of many multi-section hard truck bed covers may be stored in the cargo bay, the sections typically occupy a significant portion of the cargo bay, substantially limiting the amount of cargo that can be stored in the cargo bay along with the sections.

It would therefore be advantageous to have a truck bed cover with multiple, rigid sections that may be stored in the cargo bay without taking up a significant portion of the cargo bay. Such a truck bed cover would offer a relatively high degree of security from vandalism and theft when covering the truck bed (i.e., deployed), yet would not substantially limit the amount of cargo that can be stored in the cargo bay along with the sections when stowed.

SUMMARY OF THE INVENTION

The present invention teaches certain benefits in construction and use which give rise to the objectives described below.

The present invention provides a cargo bed cover for covering a cargo bed, wherein the cargo bed extends between a pair of side rails, a front wall, and a rear wall. The cargo bed cover has a plurality of overlapping panels, and a means for associating the plurality of overlapping panels such that the panels are movable between an extended configuration and a stored configuration. In the extended configuration, the plurality of overlapping panels are extended in combination from the front wall to the rear wall. In the stored configuration, the plurality of overlapping panels are stacked vertically within or adjacent to the cargo bed.

A primary objective of the present invention is to provide a truck bed cover, or a cover for the cargo bay of a similar vehicle, having advantages not taught by the prior art.

Another objective is to provide a truck bed cover that functions to protect items stored in a vehicle from exposure, vandalism, and theft.

A further objective is to provide a truck bed cover that includes sections that may be stored vertically in the cargo bay without taking up a significant portion of the cargo bay.

Other features and advantages of the present invention will become apparent from the following more detailed description, taken in conjunction with the accompanying drawings, which illustrate, by way of example, the principles of the invention.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
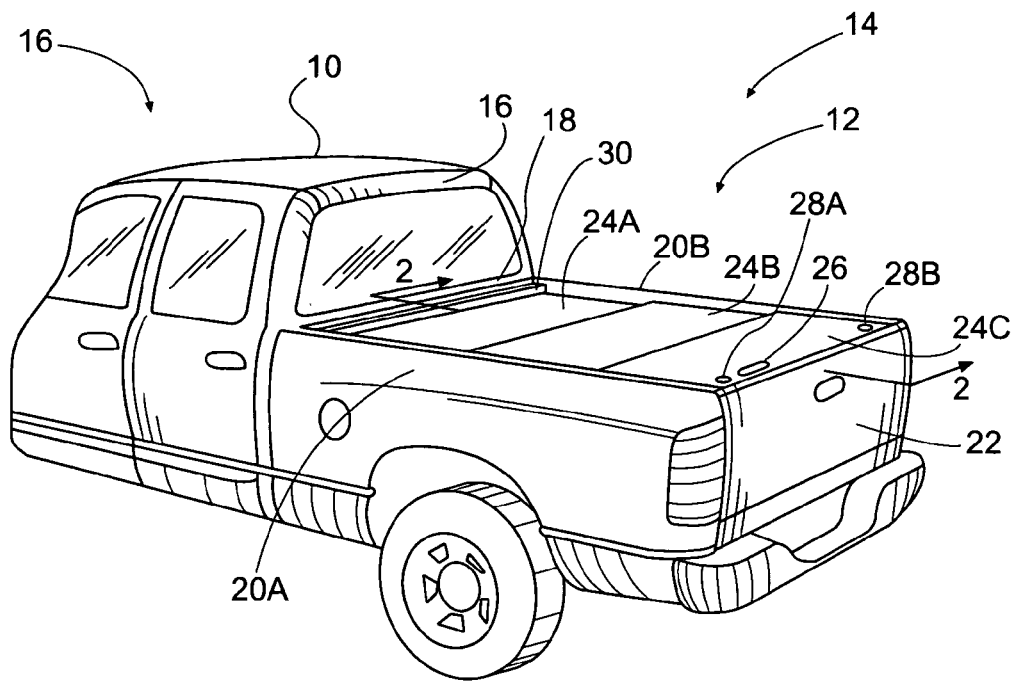
FIG. 1 is a perspective view of a portion of a pickup truck including one embodiment of a retractable truck bed cover, wherein the truck bed cover is installed in, and extends over an upper portion of a bed or cargo bay, and wherein the truck bed cover includes multiple panels.

FIG. 1 is a perspective view of a portion of a pickup truck 10 including one embodiment of a retractable truck bed cover 12, wherein the truck bed cover 12 is installed in, and extends over an upper portion of, a bed or cargo bay 14. The pickup truck 10 is a conventional pickup truck, including an enclosed cabin 16 for passengers and the cargo bay 14. In this embodiment, the cargo bay 14 begins at a rear wall 18 of the cabin 16, and includes two side rails 20A and 20B and a tail gate 22 opposite the rear wall 18.

The retractable truck bed cover 12 includes multiple overlapping sections or panels 24A–24C. The panels 24A–24C are oriented substantially parallel to one another and perpendicular to the side rails 20A and 20B. Panels 24A–24C that are adjacent are in continuous contact with one another, and all of the panels travel in the same direction when the truck bed cover 12 is deployed and stowed. The panels 24A–24C thus operate in a telescoping manner.

As shown in FIGS. 1, 2, and 6–10, the truck bed cover 12 includes a means for associating the plurality of overlapping panels 24A–24C such that the panels 24A–24C are movable between an extended configuration (shown in FIGS. 1 and 2), wherein the plurality of overlapping panels 24A–24C are extended in combination from adjacent of the cabin 16 to the tail gate 22 by sliding, and a stored configuration (shown in FIG. 10), wherein the plurality of overlapping panels 24A–24C are stacked vertically within or adjacent to the truck bed 14.

One embodiment of the means for associating is described in greater detail below. However, the scope of the invention should not be limited to this one particular embodiment, but should include alternative constructions that could be devised by those skilled in the art. For example, various connectors, slides, brackets, or attachments could be used to slidably connect the panels 24A–24C, and also enable the panels 24A–24C to pivot to the stored configuration. Such alternative constructions should be considered within the scope of the present invention, as claimed.

In the embodiment of FIG. 1, the truck bed cover 12 is shown in a deployed position and includes 3 telescoping panels 24A–24C. Each of the panels 24A–24C is substantially rectangular and extends between the side rails 20A and 20B. In the deployed position of FIG. 1, the overlapped panels 24A–24C in combination extend between the rear wall 18 of the cabin 16 and the tail gate 22.

More specifically, each of the substantially rectangular panels 24A–24C has two pairs of opposed edges. One pair of opposed edges of each of the panels 24A–24C is positioned adjacent to the side rails 20A and 20B. A front edge of the panel 24A is adjacent to the rear wall 18 of the cabin 16, and an opposed rear edge extends toward the tail gate 22. A front edge of the panel 24B is positioned above the panel 24A, and an opposed rear edge extends toward the tail gate 22. A front edge of the panel 24C is positioned above the panel 24B, and an opposed rear edge is adjacent to the tail gate 22.

In the embodiment of FIG. 1, the panel 24C includes a recessed handle 26 between a pair of lock cylinders 28A and 28B. The handle 26 is used to transition the truck bed cover 12 between the deployed position of FIG. 1 and a stowed position. The lock cylinders 28A and 28B are parts of corresponding lock mechanisms used to lock the truck bed cover 12 in the deployed position, thereby protecting any cargo stored in the cargo bay 14 from vandalism and theft. The lock cylinders 28A and 28B are positioned in a rear portion of the panel 28C near the edge adjacent to the tail gate 22. The lock cylinder 28A is adjacent to the side rail 20A, and the cylinder 28B is adjacent to the side rail 20B.

In the embodiment of FIG. 1, a holding bar 30 is attached to the rear wall 18 of the cabin 16 and extends between the side rails 20A and 20B. The holding bar 30 serves to prevent the panels 24A–24C, and particularly the panel 24A, from being lifted up when the truck bed cover 12 is in the deployed position (e.g., by a vacuum caused by a high wind passing over the cabin 16, or by a thief). The holding bar 30 also serves to help keep the panels 24A–24C in the cargo bay 14 when the truck bed cover 12 is in the stowed position.

Figure 2:
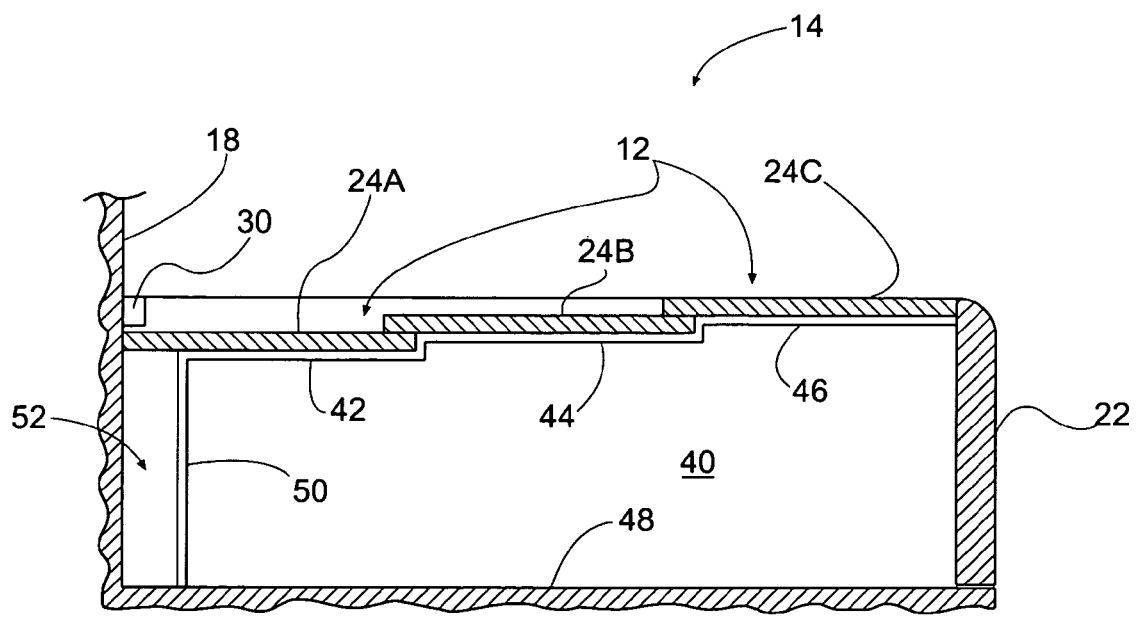
FIG. 2 is a cross-sectional view of the cargo bay of the pickup truck of FIG. 1 as indicated in FIG. 1.

FIG. 2 is a cross-sectional view of the cargo bay 14 of the pickup truck 10 of FIG. 1 as indicated in FIG. 1. Shown in FIG. 2, in addition to the panels 28A–28C, is a right side frame 40 of the truck bed cover 12. The right side frame 40 is attached to an interior surface the side rail 20B of FIG. 1. A similar left side frame is attached to an interior surface of the side rail 20A of FIG. 1.

As indicated in FIG. 2, in this embodiment the means for associating includes three stair-stepped surfaces 42, 44, and 46 that extend outwardly from the side rails 20A and 20B at different elevations relative to a bottom surface 48 of the bed or cargo bay 14. In the deployed position of FIGS. 2 and 3, the surfaces 42, 44, and 46 are in contact with, and physically support, the respective panels 24A, 24B, and 24C.

In this embodiment, the means for associating also includes a surface 50, preferably a generally vertical ridge, supporting the panel 24A in the stowed position described in more detail below. In the stowed position, the panels 24A–24C are positioned in a region 52 existing between the rear wall 18 of the cabin 16 and the surface 50. While the stair-stepped surfaces 42, 44, and 46, and the surface 50, are one embodiment of the means for associating, other support surfaces, indentations, guides, slots, posts, or similar structures could also be used, and should be considered within the scope of the present invention.

Figure 3:
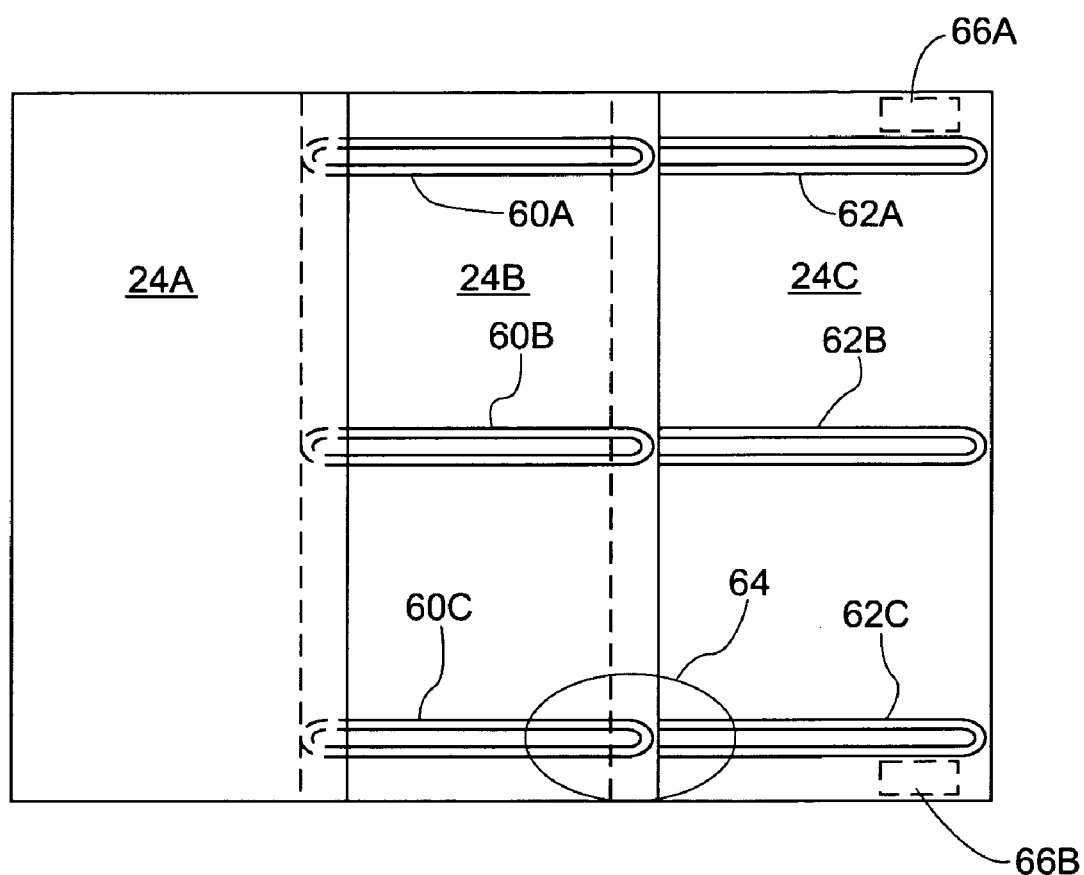
FIG. 3 is a bottom plan view of one embodiment of the panels of the truck bed cover of FIGS. 1 and 2, wherein the truck bed cover includes 2 lock mechanisms.

FIG. 3 is a bottom plan view of one embodiment of the panels 24A–24C of the truck bed cover 12 of FIGS. 1 and 2 in the deployed position. The embodiment of FIG. 3 illustrates another component of the means for associating, slide frames 60A–60C positioned in the panel 24B and extending between a front portion and a rear portion. The panel 24C may have 3 slide frames 62A–62C positioned therein extending between a front portion and a rear portion, although other numbers of frames could also be used. In this embodiment, the panel 24A has 3 posts extending from a rear portion of an upper surface. Each of the 3 posts is positioned in a corresponding one of the 3 slide frames 60A–60C of the panel 24B, and slides within the corresponding slide frame when the truck bed cover 12 of FIGS. 1 and 2 is transitioned between the deployed and stowed positions. While the present embodiment represents one alternative, many alternative constructions could also be used, including various brackets, slides, connectors, rails, and the like. Those constructions that could be devised by those skilled in the art, given the teachings of the present invention, should be considered within the scope of the invention as claimed.

Similarly, the panel 24B has 3 posts extending from a rear portion of an upper surface. Each of the 3 posts is positioned in a corresponding one of the 3 slide frames 62A–62C of the panel 24C, and slides within the corresponding slide frame when the truck bed cover 12 is transitioned between the deployed and stowed positions.

Figure 4:
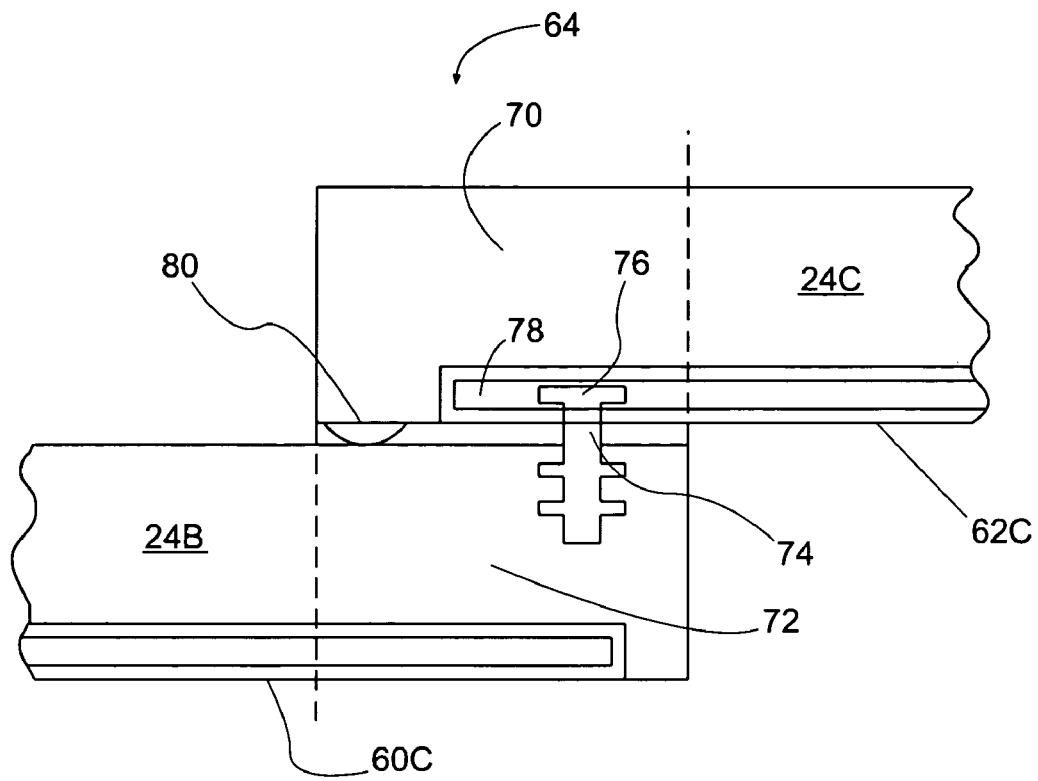
FIG. 4 is a side elevation view of a region of FIG. 3 surrounding a post of one of the panels.

A region 64 surrounding one of the 3 posts of the panel 24B is indicated in FIG. 3 and shown in more detail in FIG. 4.

Also indicated in FIG. 3 are lock mechanisms 66A and 64B. The lock mechanism 66A includes the lock cylinder 28A of FIG. 1, and the lock mechanism 66B includes the lock cylinder 28B of FIG. 1. As described above, the lock mechanisms 66A and 66B are used to lock the truck bed cover 12 in the deployed position, thereby protecting any cargo stored in the cargo bay 14 from vandalism and theft.

FIG. 4 is a side elevation view of the region 64 of FIG. 3 surrounding one of the 3 posts of the panel 24B. In the region 64, a front portion 70 of the panel 24C is positioned above, and overlaps, a rear portion 72 of the panel 24B. A post 74 is anchored in the rear portion 72 of the panel 24B and extends upward from the rear portion of the upper surface of the panel 24B as described above. A head 76 of the post 74 is captured within a cavity 78 existing within the slide frame 62C of the panel 24C such that the post 74 slidily connects the panel 24C to the panel 24B. The head 76 of the post 74 slides within the cavity 78 of the slide frame 62C when the truck bed cover 12 is transitioned between the deployed and stowed positions. Also shown in FIG. 4 is a seal 80 attached to a front portion of a bottom surface of the panel 24C and contacting the upper surface of the panel 24B such that blocks foreign objects and liquids from entering a space between the panels 24B and 24C when the truck bed cover 12 is in the deployed position.

Figure 5:
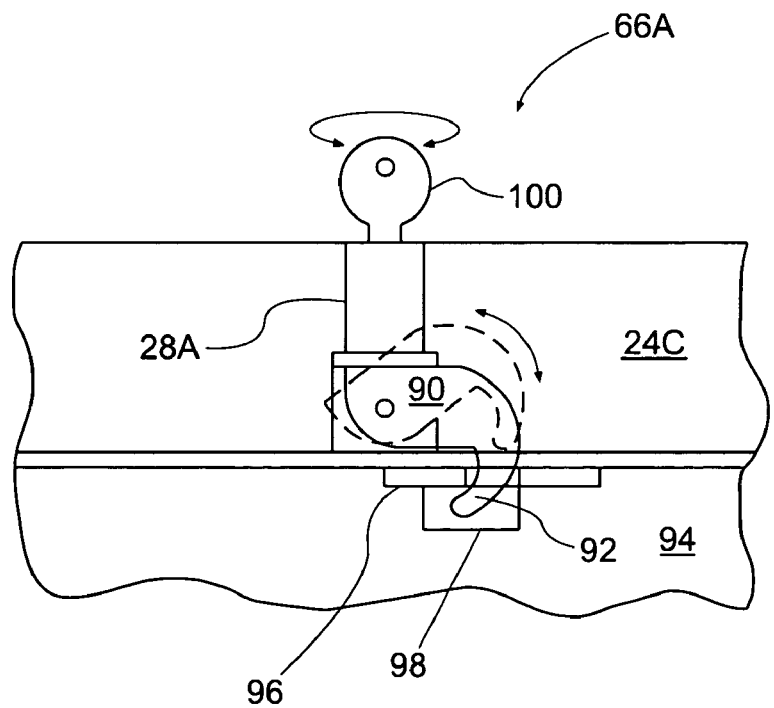
FIG. 5 is a side elevation view of one embodiment of one of the lock mechanisms of FIG. 3.

FIG. 5 is a side elevation view of one embodiment of the lock mechanism 66A of FIG. 3. In the embodiment of FIG. 5, the lock mechanism 66A includes the lock cylinder 28A of FIG. 1 and a rotating member 90 having a curved finger 92 extending therefrom. A left side frame 94 of the truck bed cover 12 of FIGS. 1 and 2 is similar to the right side frame 40 of FIG. 2, and has a plate 96 positioned in an upper surface adjacent to the lock mechanism 66A. The plate 96 has a hole extending through a center portion and dimensioned to receive the curved finger 92 of the lock mechanism 66A. A cavity 98 exists in the left side frame 94 below the plate 96.

The lock cylinder 28A accepts a key 100. When the key 100 is inserted into the lock cylinder 28A and rotated within the lock cylinder 28A, the rotating member 90 is rotated. When the rotating member 90 is rotated such that the curved finger 92 passes through the hole in the plate 96 and enters the cavity 98, the truck bed cover 12 of FIGS. 1 and 2 is locked in the deployed position. As described above, when the truck bed cover 12 is locked in the deployed position, cargo located in the cargo bay 14 of FIG. 1 is safe from vandalism and theft. When the rotating member 90 is rotated such that curved finger 92 exits the cavity 98 and the hole in the plate 96, and retracts into the panel 24C, the truck bed cover 12 is unlocked and may be transitioned from the deployed position to the stowed position.

Figure 6:
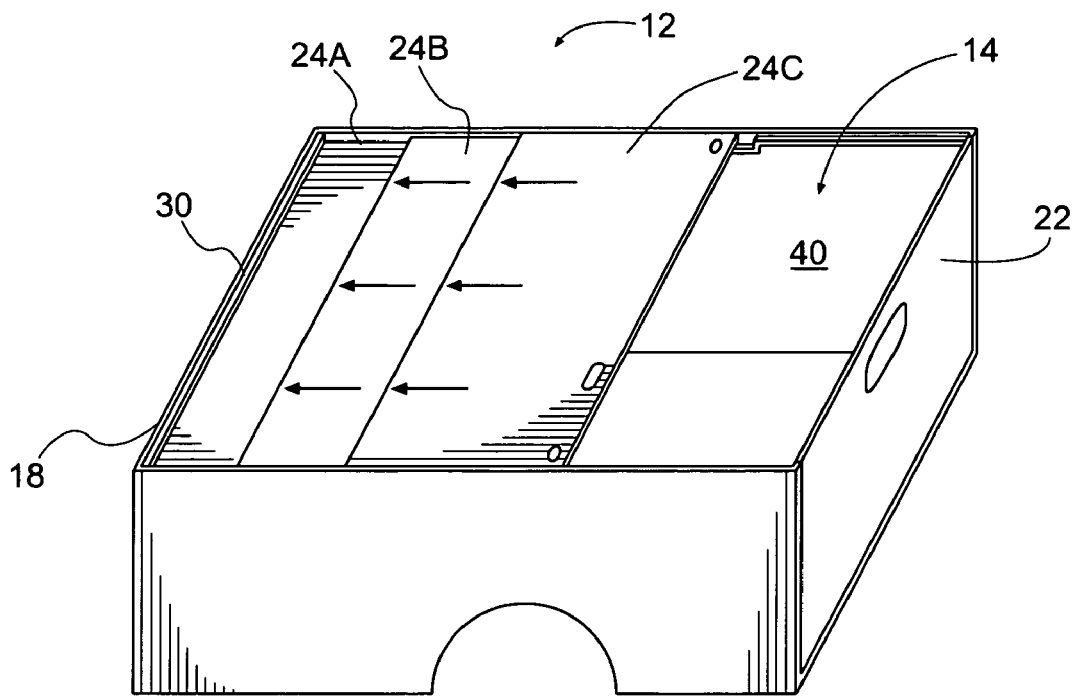
FIG. 6 is a perspective view of the truck bed cover of FIGS. 1 and 2 during a sliding operation wherein the panels are slid over one another from a tail gate of the pickup truck toward a rear wall of a cabin of the pickup truck.
Figure 7:
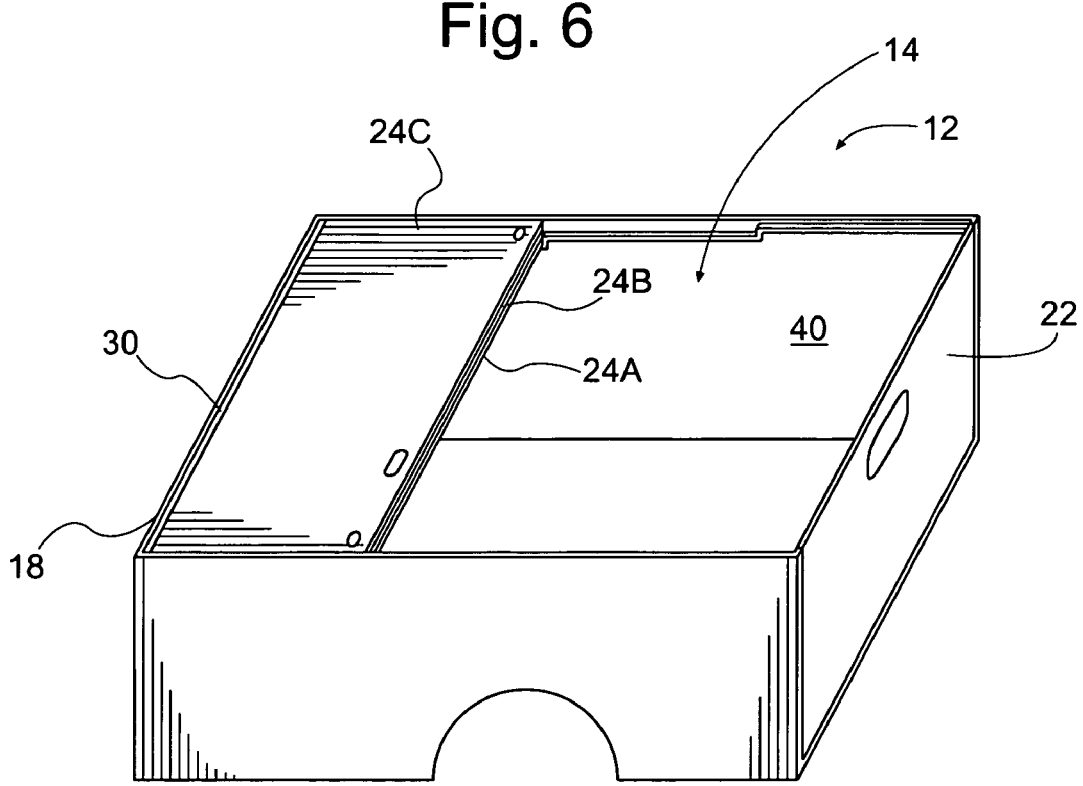
FIG. 7 is a perspective view of the truck bed cover of FIG. 6 following the sliding operation, wherein the panels are substantially horizontally stacked one over the other adjacent to the rear wall of the cabin.
Figure 8:
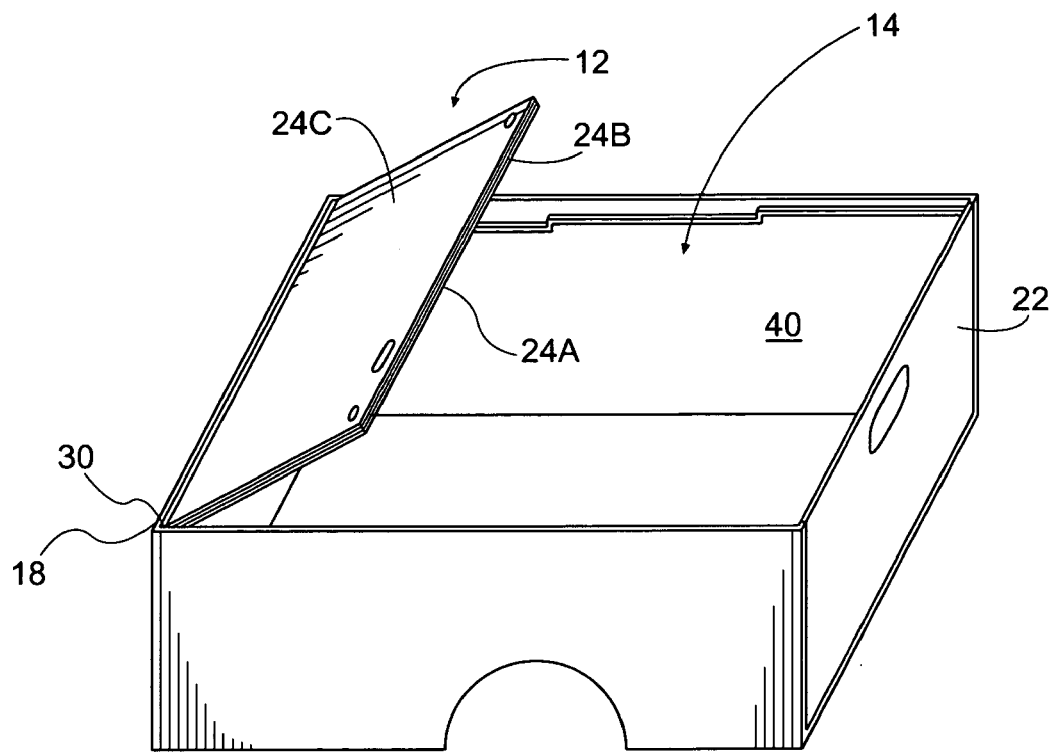
FIG. 8 is a perspective view of the truck bed cover of FIG. 7 during a rotation operation wherein the stacked panels are rotated about their front edges from the horizontal orientation of FIG. 7 to a vertical orientation.
Figure 9:
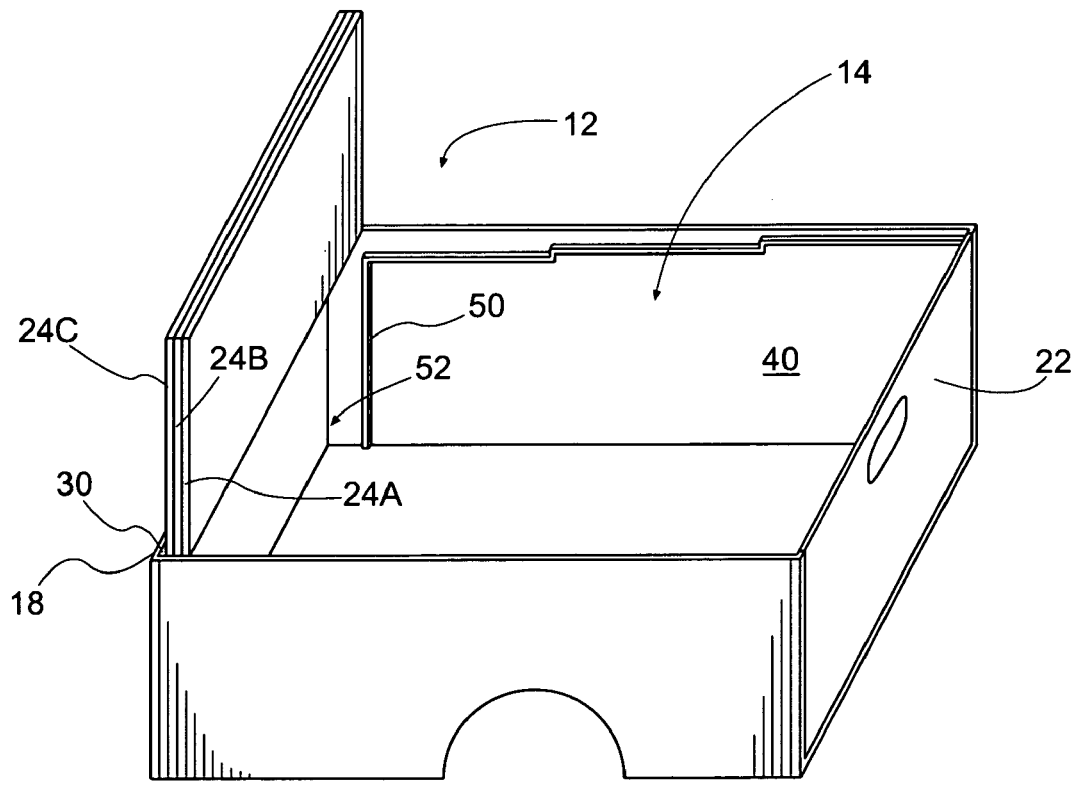
FIG. 9 is a perspective view of the truck bed cover of FIG. 8 following the rotation operation wherein the stacked panels are vertically oriented.
Figure 10:
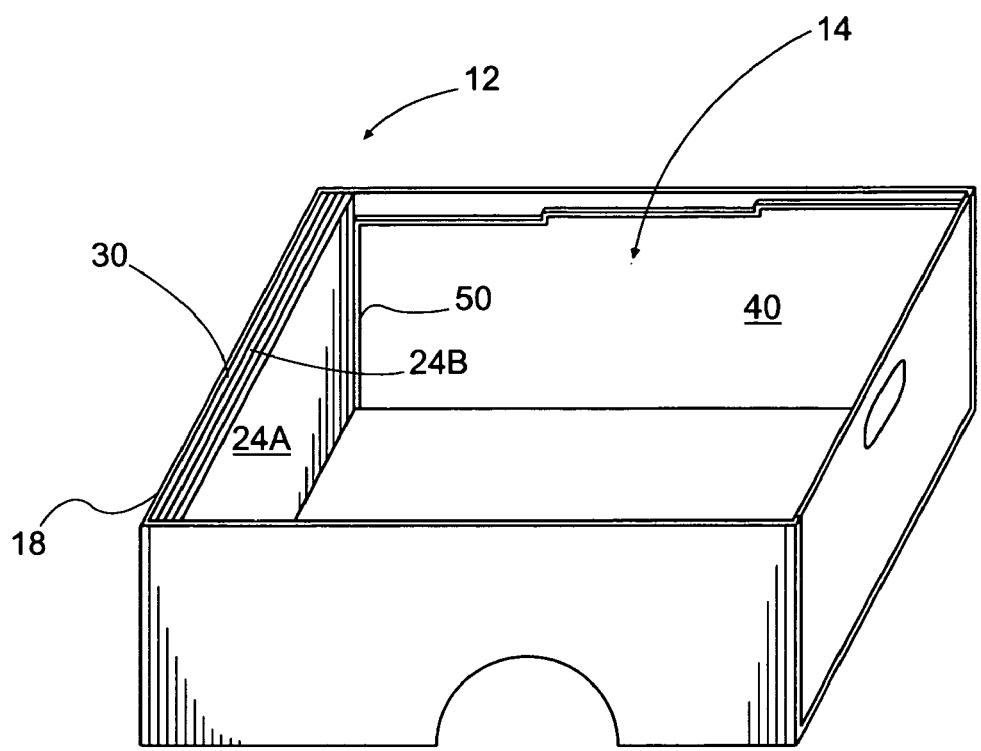
FIG. 10 is a perspective view of the truck bed cover of FIG. 9 following a lowering operation wherein the stacked panels are lowered vertically along the rear wall of the cabin and into the truck bed of FIG. 1.

FIGS. 6–10 will now be used to describe a method for retracting the truck bed cover 12 of FIGS. 1 and 2. FIG. 6 is a perspective view of the truck bed cover 12 of FIGS. 1 and 2 during a sliding operation wherein the panel 24C is slid over an upper surface of the panel 24B, and the panel 24B is slid over an upper surface of the panel 24A, from the tail gate 22 toward the rear wall 18 of the cabin 16 of FIG. 1. FIG. 7 is a perspective view of the truck bed cover 12 of FIG. 6 following the sliding operation, wherein the panels 24A–24C are substantially horizontally stacked one over the other adjacent to the rear wall 18. FIG. 8 is a perspective view of the truck bed cover 12 of FIG. 7 during a rotation operation wherein the stacked panels 24A–24C are rotated about their front edges under the holding bar 30 from the horizontal orientation of FIG. 7 to a vertical orientation. FIG. 9 is a perspective view of the truck bed cover 12 of FIG. 8 following the rotation operation wherein the stacked panels 24A–24C are vertically oriented. As shown in FIG. 2 and described above, a region 52 exists between rear wall 18 of the cabin 16 of the pickup truck 10 of FIG. 1 and the surface 50 of the right side frame 40. FIG. 10 is a perspective view of the truck bed cover 12 of FIG. 9 following a lowering operation wherein the stacked panels 24A–24C are lowered vertically along the rear wall 18 into the truck bed 14 of FIG. 1 (i.e., into the stowed position). In FIG. 10 the panel 24C is located below the holding bar 30. As described above, in the stowed position, the panels 24A–24C are located in the region 52 between the rear wall 18 of the cabin 16 and the surface 50 of the right side frame 40 as shown in FIG. 10.

Figure 11:
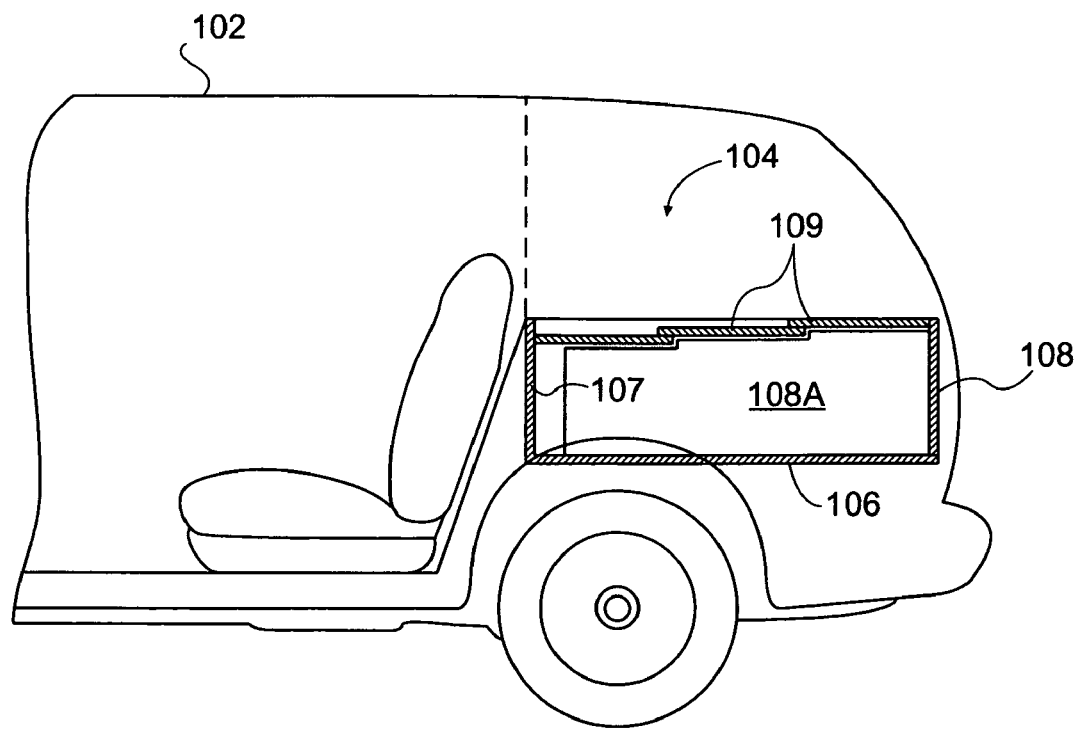
FIG. 11 is a side elevation view of a portion of a vehicle including a cargo container located in a cargo compartment of the vehicle, wherein the cargo container includes a retractable cover that is very similar to the truck bed cover of FIGS. 1–10.

While the above-described embodiments illustrate the invention as installed in a truck, the invention may also be adapted for use in other vehicles. In one embodiment, as shown in FIG. 11, a portion of a vehicle 102 has a cargo container 106 located in a cargo compartment 104 of the vehicle 102. The vehicle 102 may be, for example, a van or sport utility vehicle (SUV). The cargo container 106 includes 4 sides, a bottom, and a retractable cover 109 that is very similar to the truck bed cover 12 of FIGS. 1–10.

That is, the cargo container 106 includes a first side 107 and an opposed second side 108. The cover 109 includes multiple overlapping panels, as described above. The cargo container 106 also includes a third side 108A and an opposed fourth side (not shown, but a mirror image of the third side 108A). Each the panels of the cover 109 is substantially rectangular and extends between the third and fourth sides 108A (and mirror). In the embodiment of FIG. 11, the third and fourth sides 108A (and mirror) are adapted to support each of the panels when the panels are extended from the first side 107 to the second side 108. That is, the third and fourth sides 108A each include multiple surfaces, as described above, and each surface is adapted to support a different one of the panels when the panels are extended from the first side to the second side. In one embodiment, one of the panels may include a handle and at least one lock mechanism, as described above.

Figure 12:
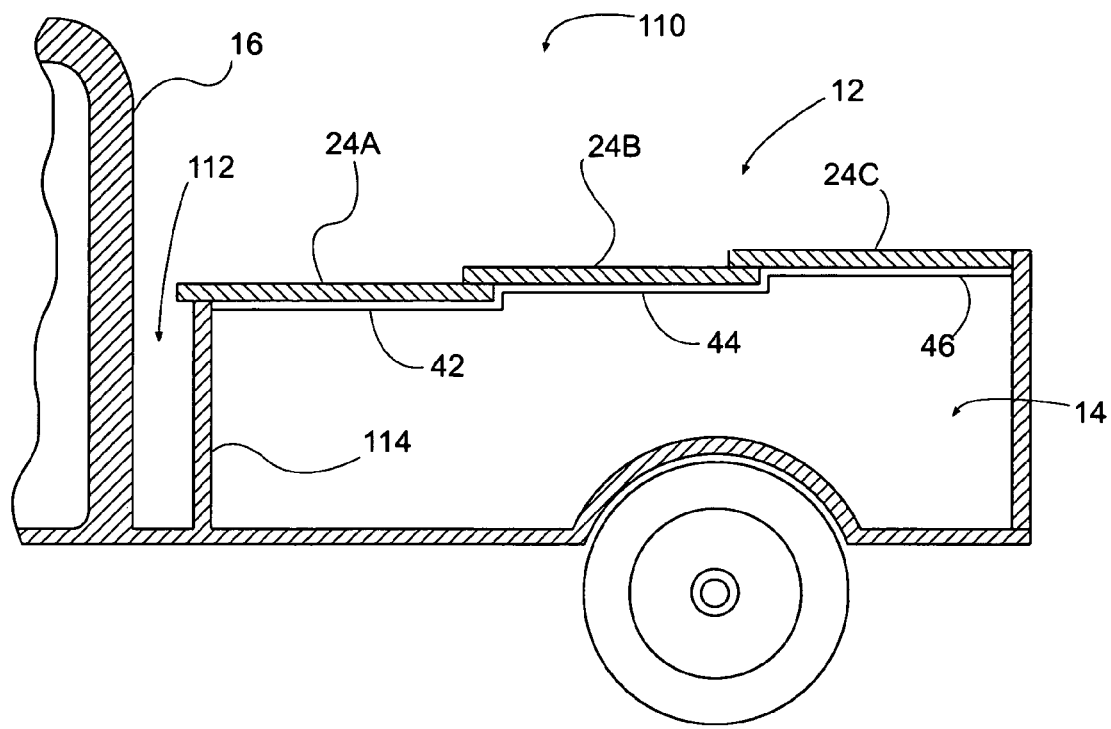
FIG. 12 is a cross-sectional view of the cargo bay of an alternative embodiment of the pickup truck, wherein the truck bed cover is adapted to be stored in a storage compartment between the cab and the cargo bay.

FIG. 12 is a cross-sectional view of the cargo bay 14 of an alternative embodiment of the pickup truck 110. In this embodiment, the truck bed cover 12 is adapted to be stored in a storage compartment 112 between the enclosed cabin 16 and the cargo bay 14. In this embodiment, the surface 50 is provided by a front sidewall 114. As illustrated by FIG. 12, it is not necessary that the panels 24A–24C be positioned within the cargo bay 14, but may be positioned adjacent the cargo bay 14 in an associated space such as the storage compartment 112. Obviously, this arrangement could be reversed in an equivalent arrangement, wherein the panels 24A–24C are stored in or adjacent to the tailgate of the pickup truck 110, or even where the panels 24A–24C slide laterally to a side of the cargo bay 14 and are stored in this location. The terminology in the claims should be expressly defined to encompass these equivalent embodiments.

Figure 13:
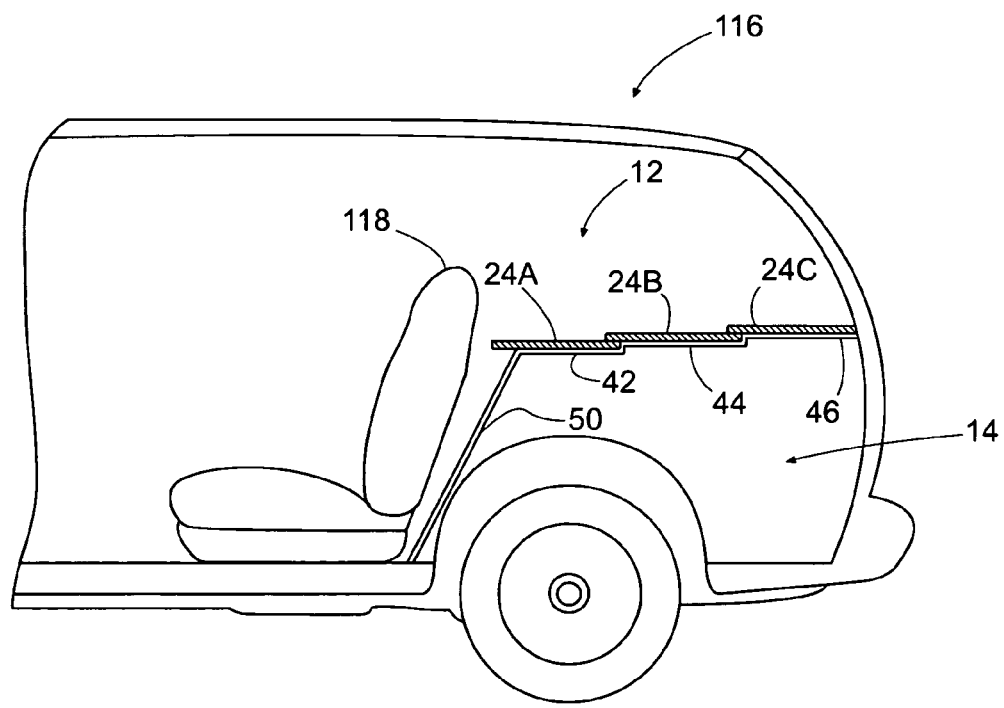
FIG. 13 is a cross-sectional view of the cargo bay of a van wherein the truck bed cover is adapted to cover the cargo bay of the van, the truck bed cover being adapted to be stored in a storage compartment adjacent a rear seat of the van.

In another equivalent embodiment, as shown in FIG. 13, the truck bed cover 12 is adapted to cover the cargo bay 14 of a van 116. In this embodiment, the truck bed cover 12 is adapted to be stored between a rear seat 118 or similar wall and the surface 50.

Figure 14:
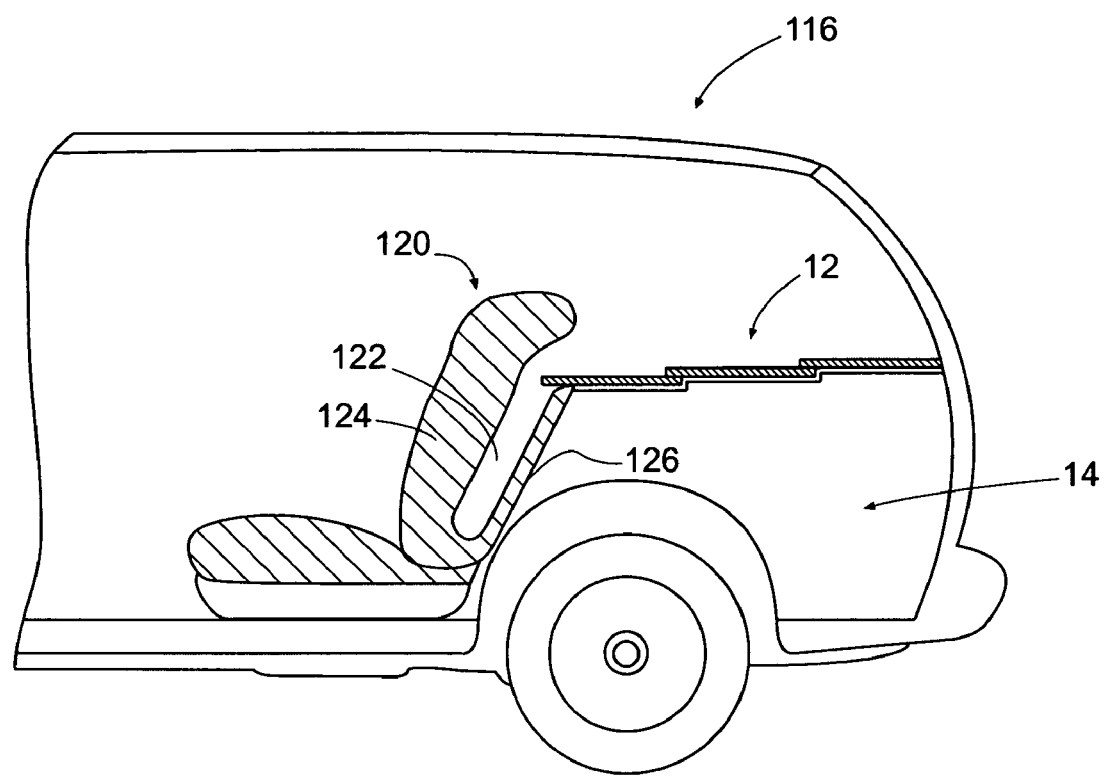
FIG. 14 is a cross-sectional view of the cargo bay of a van wherein the truck bed cover is adapted to be stored in a storage compartment within the rear seat of the van.

FIG. 14 is a cross-sectional view of the cargo bay 14 of the van 116 wherein the truck bed cover 12 is adapted to be stored within a specially designed rear seat 120. In this final alternative embodiment, the rear seat 120 includes a storage space 122 defined by a front sidewall 124 and a rear sidewall 126, and the panels 24A–24C are adapted to be stored in the storage space 122.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A truck bed cover for covering a truck bed, wherein the truck bed extends between a pair of side rails and adjacent a cabin to a tail gate, the truck bed cover comprising:
    a plurality of overlapping panels; and
    a means for associating the plurality of overlapping panels such that the plurality of overlapping panels are movable by sliding between an extended configuration, wherein the plurality of overlapping panels together extend from adjacent the cabin to the tail gate, and a stored configuration, wherein the plurality of overlapping panels are stacked and vertically oriented within or adjacent to the truck bed.

2. The truck bed cover as recited in claim 1, wherein the plurality of overlapping panels are retractable by sliding to adjacent the cabin.

3. The truck bed cover as recited in claim 1, wherein the means for associating includes stair-stepped surfaces extending from each of the side rails for supporting the plurality of overlapping panels when the plurality of overlapping panels are disposed in the extended configuration.

4. The truck bed cover as recited in claim 1, wherein the means for associating includes a surface extending from each of the side rails for supporting the plurality of overlapping panels when the plurality of overlapping panels are disposed in the stowed position.

5. The truck bed cover as recited in claim 4, wherein the surface is a generally vertical ridge.

6. The truck bed cover as recited in claim 1, wherein each of the panels comprises opposed front and rear edges, and wherein when the panels together extend from adjacent the cabin to the tail gate, the front edge of one of the panels is positioned adjacent to the cabin, and the front edges of the remaining panels face the cabin.

7. The truck bed cover as recited in claim 6, wherein when the panels together extend from adjacent the cabin to the tail gate, the rear edge of one of the panels is positioned adjacent to the tail gate, and the rear edges of the remaining panels face the tail gate.

8. The truck bed cover as recited in claim 6, wherein the plurality of overlapping panels comprises a first panel, a second panel, and a third panel, and wherein when the panels together extend from adjacent the cabin to the tail gate, the front edge of the second panel is positioned above the first panel, and the front edge of the third panel is positioned above the second panel.

9. The truck bed cover as recited in claim 8, wherein when the panels together extend from adjacent the cabin to the tail gate, the front edge of the first panel is positioned adjacent to the cabin, and the rear edge of the third panel is positioned adjacent to the tail gate.

10. The truck bed cover as recited in claim 1, further comprising:
    a pair of side frames each positioned adjacent to a different one of the side rails and adapted to support each of the panels when the panels together extend from adjacent the cabin to the tail gate.

11. The truck bed cover as recited in claim 10, wherein the means for associating includes a plurality of surfaces of each of the side frames, each of the plurality of surfaces being adapted to support a different one of the panels when the panels together extend from adjacent the cabin to the tail gate.

12. The truck bed cover as recited in claim 1, wherein one of the panels includes a handle and at least one lock mechanism.

13. The truck bed cover as recited in claim 1, further comprising a holding bar coupled to a rear wall of the cabin and extending between the side rails for preventing the panels from being lifted up when the panels are extended from the rear wall of the cabin to the tail gate.

14. A cargo bed cover for covering a cargo bed, wherein the cargo bed extends between a pair of side rails, a front wall, and a rear wall, the cargo bed cover comprising:
    a plurality of overlapping panels; and
    a means for associating the plurality of overlapping panels such that the panels are movable between an extended configuration, wherein the plurality of overlapping panels together extend from the front wall to the rear wall, and a stored configuration, wherein the plurality of overlapping panels are stacked and vertically oriented within or adjacent to the truck bed.

15. The cargo bed cover as recited in claim 14, wherein the plurality of overlapping panels are retractable by sliding to adjacent the front wall.

16. The cargo bed cover as recited in claim 14, wherein the means for associating includes stair-stepped surfaces extending from each of the side rails for supporting the plurality of overlapping panels when the plurality of overlapping panels are disposed in the extended configuration.

17. The cargo bed cover as recited in claim 14, wherein the means for associating includes a surface extending from each of the side rails for supporting the plurality of overlapping panels when the plurality of overlapping panels are disposed in the stowed position.

18. A method for retracting a truck bed cover extending over a truck bed between a pair of side rails and from a rear wall of a cabin to a tail gate, the method comprising:
    sliding a plurality of panels of the track bed cover over one another from the tail gate toward the rear wall of the cabin until the panels are substantially vertically stacked and horizontally oriented adjacent to the rear wall of the cabin;
    rotating the stacked panels to a vertical orientation; and
    lowering the stacked panels vertically along the rear wall of the cabin and into the truck bed.

19. A cargo container for use in an automotive vehicle, comprising:
    a first side and an opposed second side;
    a plurality of overlapping panels; and
    a means for associating the plurality of overlapping panels such that the panels are movable between an extended configuration, wherein the plurality of overlapping panels together extend from the first side to the second side, and a stored configuration, wherein the plurality of overlapping panels are stacked and vertically oriented within or adjacent to the first side.

20. The cargo container as recited in claim 19, wherein the means for associating includes a surface for supporting the plurality of panels in the stored configuration.

* * * * *